US008037026B1

(12) United States Patent
Singhal

(10) Patent No.: US 8,037,026 B1
(45) Date of Patent: Oct. 11, 2011

(54) PROTECTED USER-CONTROLLABLE VOLUME SNAPSHOTS

(75) Inventor: Ashok Singhal, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 11/173,101

(22) Filed: Jul. 1, 2005

(51) Int. Cl.
G06F 7/00 (2006.01)
G06F 17/00 (2006.01)

(52) U.S. Cl. ............................................... 707/639

(58) Field of Classification Search .................. None
See application file for complete search history.

(56) References Cited

U.S. PATENT DOCUMENTS

| | | | | |
|---|---|---|---|---|
| 5,335,346 | A * | 8/1994 | Fabbio ........................ | 711/163 |
| 5,450,593 | A * | 9/1995 | Howell et al. ................. | 726/21 |
| 5,794,242 | A * | 8/1998 | Green et al. ................... | 707/10 |
| 5,991,810 | A * | 11/1999 | Shapiro et al. ................ | 709/229 |
| 6,073,161 | A * | 6/2000 | DeBoskey et al. ........... | 709/200 |
| 6,341,341 | B1 * | 1/2002 | Grummon et al. ........... | 711/162 |
| 6,718,376 | B1 * | 4/2004 | Chu et al. ..................... | 709/223 |
| 6,792,540 | B1 * | 9/2004 | Smith et al. ................... | 726/31 |
| 6,957,221 | B1 * | 10/2005 | Hart et al. .................... | 707/100 |
| 7,334,095 | B1 * | 2/2008 | Fair et al. ..................... | 711/161 |
| 7,356,574 | B2 * | 4/2008 | Demmon ...................... | 709/219 |
| 7,389,313 | B1 * | 6/2008 | Hsieh et al. .................. | 707/204 |
| 7,568,080 | B2 * | 7/2009 | Prahlad et al. ............... | 711/162 |
| 7,587,563 | B1 * | 9/2009 | Teterin et al. ................ | 711/162 |
| 2002/0103654 | A1 * | 8/2002 | Poltorak ........................ | 705/1 |
| 2003/0088658 | A1 * | 5/2003 | Davies et al. ................. | 709/223 |
| 2003/0131182 | A1 * | 7/2003 | Kumar et al. ................. | 711/5 |
| 2004/0068636 | A1 * | 4/2004 | Jacobson et al. ............. | 711/203 |
| 2004/0230737 | A1 * | 11/2004 | Burton et al. ................. | 711/3 |
| 2004/0254936 | A1 * | 12/2004 | Mohamed ..................... | 707/10 |
| 2005/0010592 | A1 * | 1/2005 | Guthrie ........................ | 707/104.1 |
| 2005/0246397 | A1 * | 11/2005 | Edwards et al. ............. | 707/204 |
| 2005/0262296 | A1 * | 11/2005 | Peake ........................... | 711/111 |
| 2006/0179261 | A1 * | 8/2006 | Rajan ........................... | 711/162 |
| 2006/0271608 | A1 * | 11/2006 | Qi et al. ....................... | 707/205 |

OTHER PUBLICATIONS

Bryan Betts, "3PAR adds DIY tool for snapshots," The Register, published Wed. Feb. 16, 2005, downloaded on Mar. 15, 2005 from http:||www.theregister.co.uk1200510211613par adds diy tools for snapshots/print.html, pp. 1-2.*
"3PAR Delivers my Snapshot for Increased Productivity with Easy Access to Just-In-Time Test Data," downloaded on Mar. 15, 2005 from http:||www.3par.com|news| pr/02205.html, pp. 1-3.*

(Continued)

Primary Examiner — Kuen Lu
Assistant Examiner — Rachel J Lee

(57) ABSTRACT

A method is provided to allow a user on a host system to update a specific snapshot in a data storage system where the user does not have other editing privileges. The method includes (1) receiving a request to update the snapshot from the user and (2) determining from an access control list if the user is permitted to update the snapshot. If the user is permitted to update the snapshot, the method includes (3) recording parameters for a VLUN (virtual logic unit) associated with the snapshot, (4) removing the VLUN from the data storage system, (5) replacing the snapshot with a new snapshot created from a parent volume of the snapshot, (6) recreating the VLUN for the new snapshot from the recorded parameters, and (7) exporting the VLUN to the host system.

12 Claims, 3 Drawing Sheets

OTHER PUBLICATIONS

"3PAR Brings Fast Test Data Access Within Reach," downloaded on Mar. 15, 2005 from http://www.eweek.com/printarticle2/0,2533,a=146469.00.asp, pp. 1-2.*

Bryan Betts, "3PAR adds DIY tool for snapshots," The Register, published Wed. Feb. 16, 2005, downloaded on Mar. 15, 2005 from http://www.theregister.co.uk/2005/02/16/3par adds diy tools for snapshots/print.html, pp. 1-2.

"3PAR Delivers my Snapshot for Increased Productivity with Easy Access to Just-In-Time Test Data," downloaded on Mar. 15, 2005 from http://www.3par.com/news/ pr/02205.html, pp. 1-3.

* cited by examiner

PROTECTED USER-CONTROLLABLE VOLUME SNAPSHOTS

FIELD OF INVENTION

This invention relates to snapshots in data storage systems.

DESCRIPTION OF RELATED ART

Volume snapshots allow the creation of virtual copies of a volume that can then be used for development and testing of new applications on actual production data. In a development or testing environment, the data in the snapshot can often be corrupted as a result of bugs or the testing process. When this occurs, it is desirable to "refresh" the old snapshots with newly created snapshots having the original or current data. Typically a user account with storage administration privileges is required to create snapshots and export them. However, it is not desirable to give such privileges to all developers and testers since they could accidentally (or ignorantly) issue commands that destroy other data. Therefore, these users typically ask a storage administrator to perform the task for them. This increases the workload on the storage administrator and also limits the automation that can be applied to testing since it requires manual intervention.

SUMMARY

In one embodiment of the invention, a method is provided to allow a user on a host system to update a specific snapshot in a data storage system where the user does not have other editing privileges. The method includes (1) receiving a request to update the snapshot from the user and (2) determining from an access control list if the user is permitted to update the snapshot. If the user is permitted to update the snapshot, the method includes (3) recording parameters for a VLUN (virtual logic unit) associated with the snapshot, (4) removing the VLUN from the data storage system, (5) replacing the snapshot with a new snapshot created from a parent volume of the snapshot, (6) recreating the VLUN for the new snapshot from the recorded parameters, and (7) exporting the VLUN to the host system.

BRIEF DESCRIPTION OF THE DRAWINGS

Use of the same reference numbers in different figures indicates similar or identical elements.

DETAILED DESCRIPTION

Figure 1:
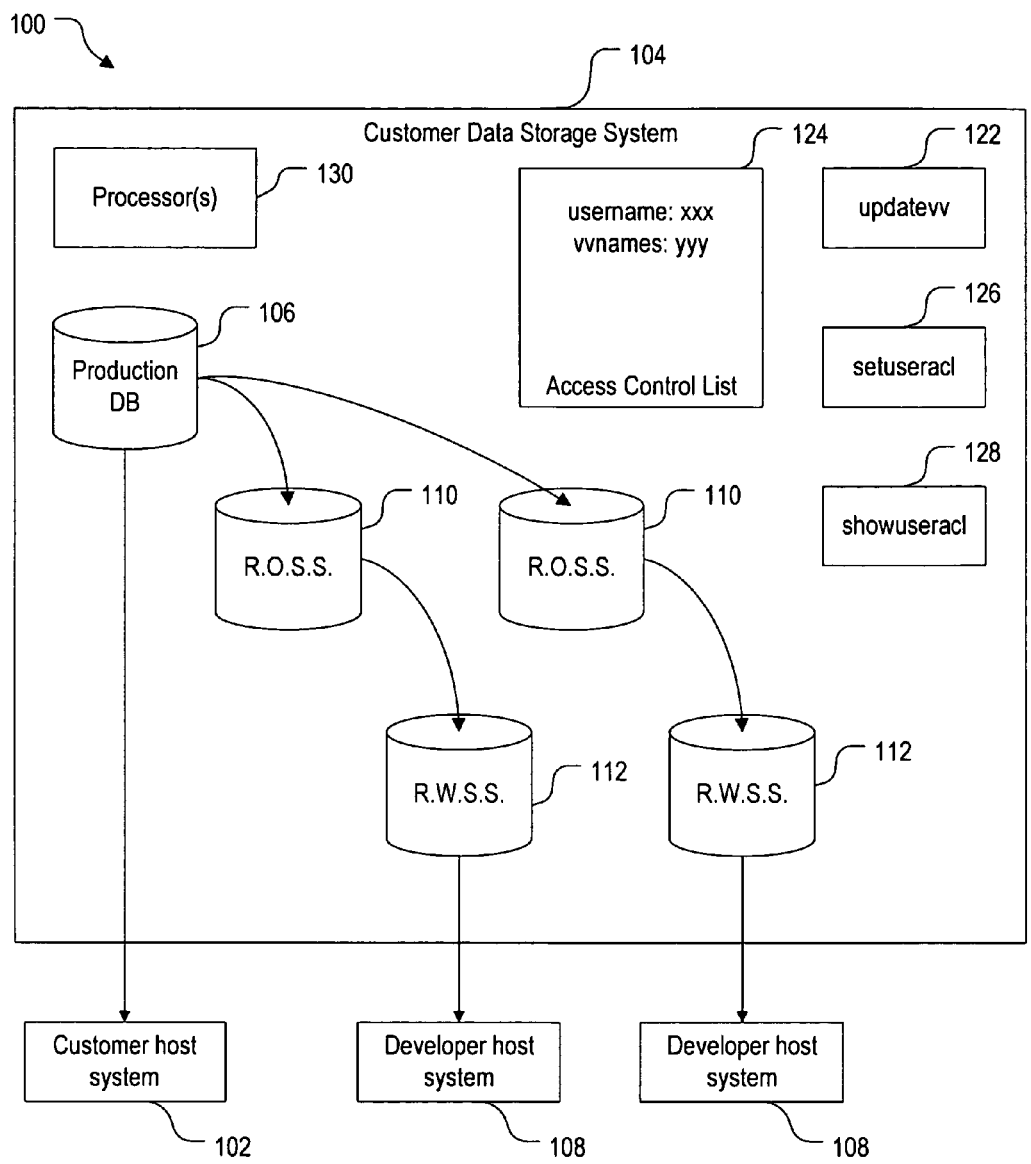
FIG. 1 illustrates a networked storage system in one embodiment of the invention.

FIG. 1 illustrates a networked storage system 100 for a customer in one embodiment of the invention. A customer host system 102 (e.g., a server computer) is coupled to a data storage system 104 to access a production database 106 in the normal course of business. In one embodiment, data storage system 104 is an InServ® Storage Server available from 3PARdata of Fremont, Calif., and production database 106 is implemented as a virtual volume provided by the InForm® Operating System also available from 3PARdata. Note that used herein, a VLUN (virtual logic unit) is the mechanism used by data storage system 104 to export a virtual volume as a LUN (logic unit) so that it is visible to a host.

The customer often hires developers to test and develop new applications for production database 106. Note that the customer typically provides only browser level privileges to the developers on data storage system 104. Browser level privileges allow the developers to list the volumes present, list the hosts present, and see which volumes are exported as VLUNs to which hosts. However, browser level privileges do not allow the developers to change the VLUN exports or create new volumes. Thus, the customer provides copies of production database 106 to the developers. To do this, the administrator of data storage system 104 creates (1) read-only snapshots (R.O.S.S.) 110 of production database 106 and (2) read-write snapshots (R.W.S.S.) 112 of read-only snapshots 110. In one embodiment, these snapshots are implemented as virtual volumes. The customer then exports read-write snapshots 112 to developer host systems 108.

The developers use developer host systems 108 (e.g., server computers) to test and develop applications on read-write snapshots 112. The developers typically have full unrestricted privileges to read-write snapshots 112 on developer host systems 108. Through various reads and writes, the developers may corrupt and even destroy read-write snapshots 112 during testing and development. To alleviate the storage administrator from creating new snapshots for the developers and to also allow the automation of testing, a new command "updatevv" 122 is provided in the operating system of data storage system 104.

The updatevv command allows a developer to "refresh" or "update" one or more snapshots specified for that developer in an access control list (ACL) 124. Refreshing or updating a snapshot consists of replacing an old snapshot with a new snapshot created from the parent volume of the snapshot and recreating the VLUN of the old snapshot for the new snapshot. The udpatevv command may have the following form: updatevv [options] vvname . . . . Note vvname represents the name of the snapshot to be updated and the " . . . " indicates more than one vvname may be specified. The options for the updatevv command are:

-ro This option updates both the specified snapshot and its parent snapshot when the specified snapshot is a read-write snapshot.

-anyid This option allows the use of an available virtual volume ID for the new snapsphot.

-f This option requires confirmation before a snapshot is updated.

The developer uses the -ro option when he or she wants the read-write snapshot to have an up-to-date copy of production database. Without this option, the read-write snapshot will merely be a fresh copy of the read-only snapshot parent.

By default, the updatevv command uses the original virtual volume ID of the deleted snapshot for the new snapshot so that the new snapshot would have the same World Wide Name (WNN), which is translated from the original virtual volume ID. However, the original virtual volume ID may have been assigned to another virtual volume between the deletion of the original snapshot and the creation of the new snapshot. By using the -anyid option, the developer allows the updatevv command to use an available virtual volume ID instead of the original virtual volume ID. In host operating systems that identify virtual volumes using characteristics other than the virtual volume ID and WWN, the updatevv command would thus succeed even if the original virtual volume ID is no longer available.

The storage administrator uses a command "setuseracl" 126 to define ACL 124, and a command "showuseracl" 128 to view ACL 124. ACL 124 includes the username of the developer, the operations the developer are allowed (e.g., updatevv), and the list of the snapshots for which the operations may be performed.

Figure 2:
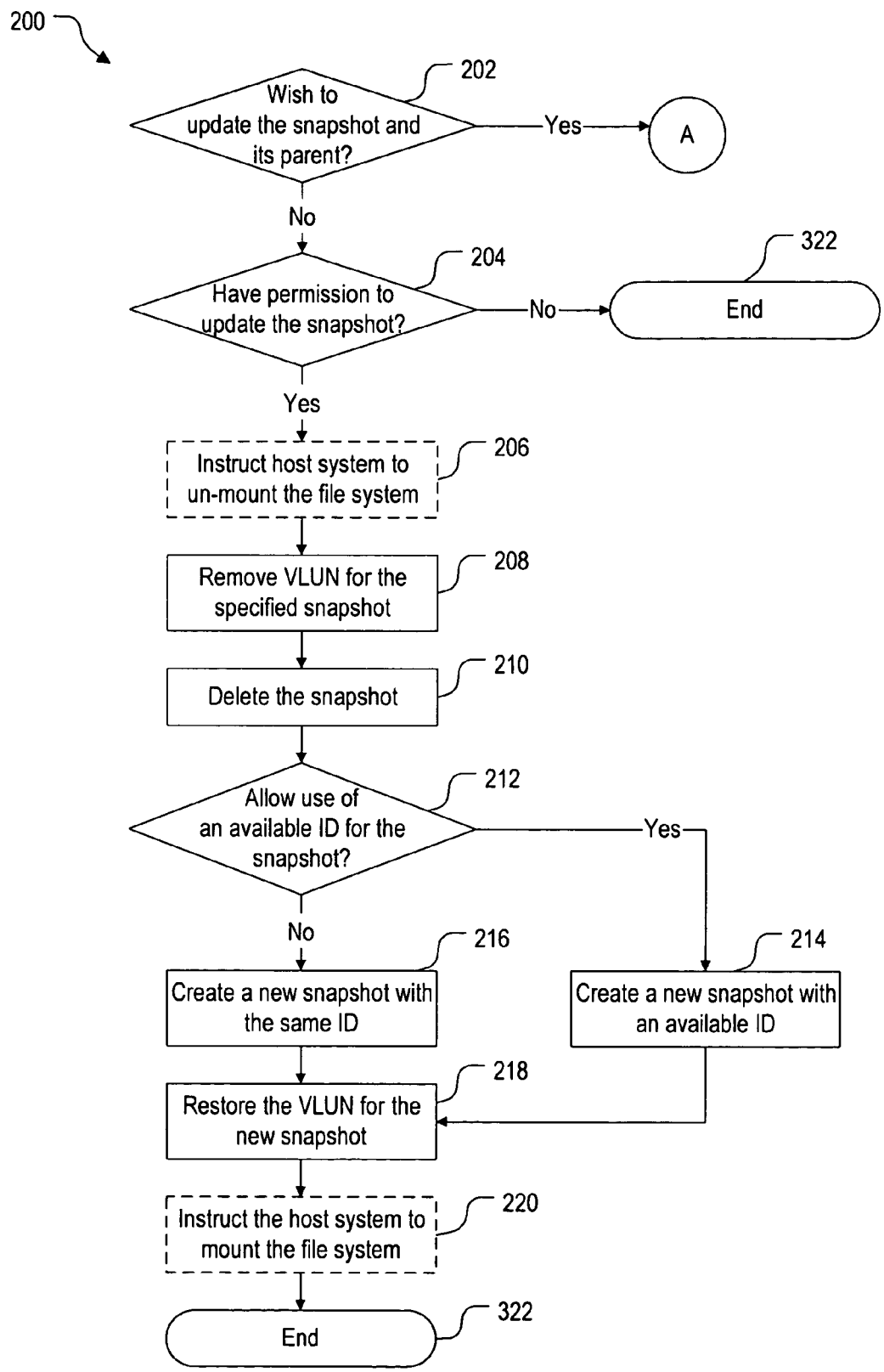
FIGS. 2 and 3 are flowcharts of a method for a user without editing privileges to update a snapshot in one embodiment of the invention.
Figure 3:
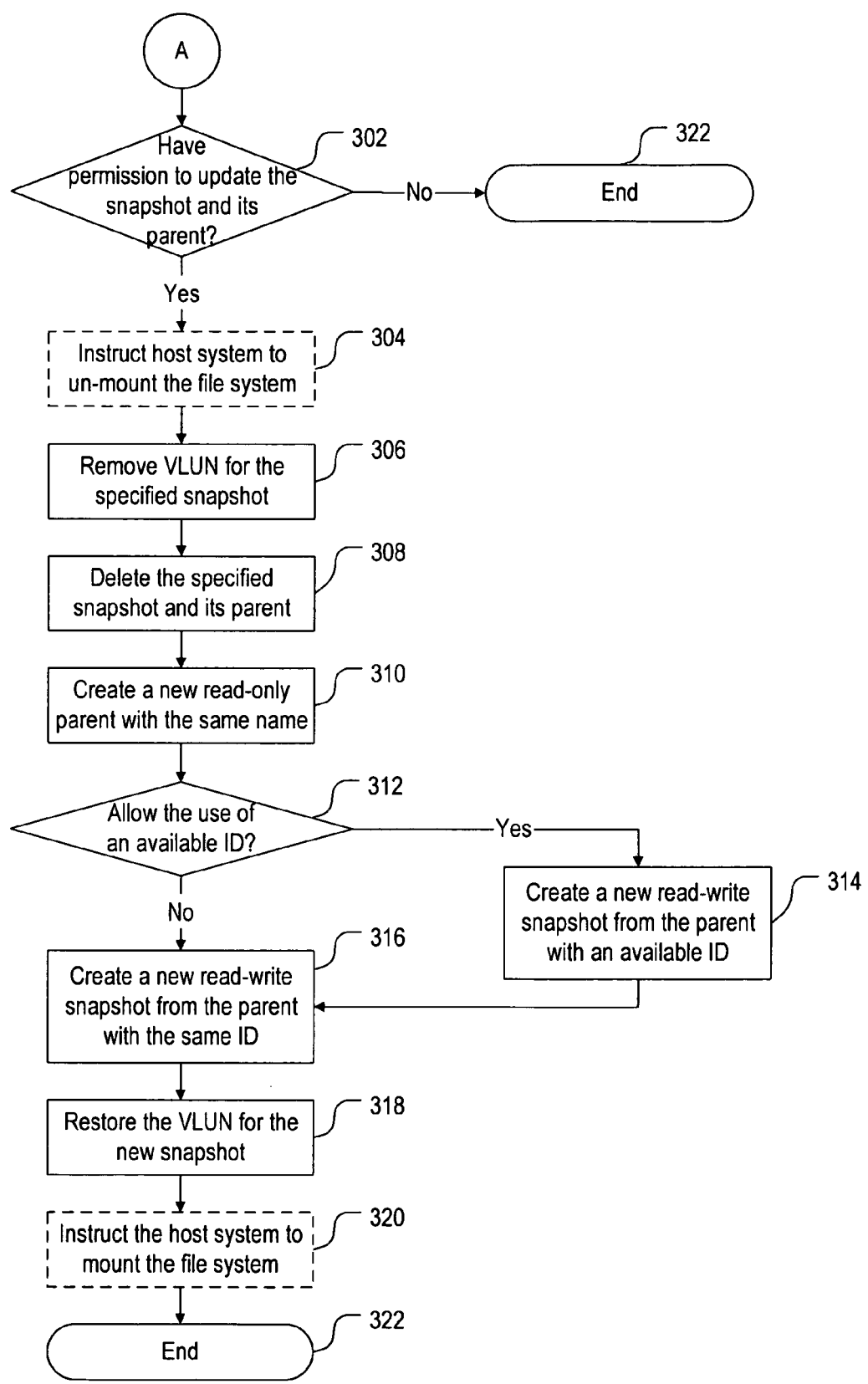

FIGS. 2 and 3 illustrate a method 200 for the updatevv command in one embodiment of the invention. Method 200 may be implemented by one or more processors 130 (FIG. 3) executing the operating system of data storage system 104.

In step 202 (FIG. 2), after processor 130 receives the updatevv command, processor 130 determines if (1) the developer wishes to update both the specified snapshot and its parent snapshot, and (2) the specified snapshot is a read-write snapshot. A developer may update both the snapshot and the parent snapshot if the developer wishes to test applications on the latest data in production database 106. If both (1) and (2) are true, then step 202 is followed by step 302 (FIG. 3). Otherwise step 202 is followed by step 204.

In step 204 (FIG. 2), processor 130 determines if the developer has permission to update the specified snapshot. Processor 130 reads ACL 124 to see if the specified snapshot is in the list of snapshots that the developer is allowed to update. If so, then step 204 is followed by an optional step 206. Otherwise step 204 is followed by step 322, which ends method 200.

In optional step 206, processor 130 prepares developer host system 108 for the deletion of a virtual logical unit number (VLUN) associated to the specified snapshot. This operation depends on the application and the file system of developer host system 108.

In one implementation where developer host system 108 is running a files system on the specified snapshot, processor 130 instructs developer host system 108 to un-mount the file system of data storage system 104 from the file system of developer host system 108. In response, developer host system 108 executes a script to un-mount the file system. Un-mounting consists of removing the file system of data storage system 104 from the file system of developer host system 108 so that the data on data storage system 104 is not available to developer host system 108.

In another implementation where developer host system 108 is running a database directly on top of the specified snapshot, processor 130 instructs developer host system 108 to halt the database from accessing the VLUN. Step 206 is followed by step 208.

Note that step 206 is optional because the developer can manually prepare developer host system 108 for the removal of the VLUN instead of processor 130.

In step 208, processor 130 "removes" the VLUN associated with the specified snapshot. In one embodiment, processor 130 records the parameters of the VLUN and then deletes the VLUN from data storage system 104. In another embodiment, processor 130 disables the VLUN on developer host system 108 without deleting it. Step 208 is followed by step 210. Note that VLUN is the mapping of the specified snapshot to developer host system 108 so that developer host system 108 can see the specified snapshot.

In step 210, processor 130 deletes the specified snapshot from data storage system 104. Step 210 is followed by step 212.

In step 212, processor 130 determines if the -anyid option has been selected. If so, then step 212 is followed by step 214. Otherwise step 212 is followed by step 216.

In step 214, processor 130 creates a new snapshot from the parent snapshot. The new snapshot is created with an available virtual volume ID. Step 214 is followed by step 218.

In step 216, processor 130 creates a new snapshot from the parent snapshot. The new snapshot has the original virtual volume ID. Step 216 is followed by step 218.

In step 218, processor 130 "restores" the VLUN for the new snapshot. In one embodiment, processor 130 recreates the VLUN for the new snapshot from the recorded parameters and exports the VLUN to developer host system 108. In another embodiment, processor 130 enables the disabled but undeleted VLUN on developer host system 108. Step 218 is followed by an optional step 220.

In optional step 220, processor 130 prepares developer host system 108 to import the VLUN associated with the new snapshot. This operation depends on the application and the file system of developer host system 108.

In one implementation, processor 130 instructs developer host system 108 to mount the file system of data storage system 104 into the file system of developer host system 108. In response, developer host system 108 executes a script to mount the file system. Mounting consists of incorporating the file system of data storage system 104 into the file system of developer host system 108 so that the data on data storage system 104 is available to developer host system 108.

In another implementation, processor 130 instructs developer host system 108 to resume a database that accesses the VLUN. Step 220 is followed by step 322, which ends method 200.

Note that step 220 is optional because the developer can manually prepare developer host system 108 for the import of the VLUN instead of processor 130 of data storage system 104.

In step 302 (FIG. 3), processor 130 determines if the developer has permission to update the specified snapshot and its parent snapshot. Processor 130 reads ACL 124 to see if the specified snapshot and the parent snapshot are both on the list of snapshots that the developer is allowed to update. If so, then step 302 is followed by an optional step 304. Otherwise step 302 is followed by step 322, which ends method 200.

In optional step 304, processor 130 instructs developer host system 108 prepare for the removal of the VLUN associated with the specified snapshot. Step 304 is similar to step 206 described above. Optional step 304 is followed by step 306.

In step 306, processor 130 "removes" the VLUN associated with the specified snapshot. In one embodiment, processor 130 records the parameters of the VLUN and then deletes the VLUN from data storage system 104. In another embodiment, processor 130 disables the VLUN on developer system 108 instead of deleting it. Step 306 is followed by step 308.

In step 308, processor 130 deletes the specified snapshot and parent snapshot from data storage system 104. Step 308 is followed by step 310.

In step 310, processor 130 creates a new parent snapshot with the same name from production database 106. Step 310 is followed by step 312.

In step 312, processor 130 determines if the -any id option has been selected. If so, then step 312 is followed by step 314. Otherwise step 312 is followed by step 316.

In step 314, processor 130 creates a new snapshot from the new parent snapshot. The new snapshot is created with an available virtual volume ID. Step 314 is followed by step 318.

In step 316, processor 130 creates a new snapshot from the new parent snapshot. The new snapshot has the original virtual volume ID. Step 316 is followed by step 318.

In step 318, processor 130 "restores" the VLUN for the new snapshot. In one embodiment, processor 130 recreates the VLUN for the new snapshot from the recorded parameters and exports the VLUN to developer host system 108. In another embodiment, processor 130 enables the disabled but undeleted VLUN on developer system 108. Step 318 is followed by an optional step 320.

In optional step 320, processor 130 prepares the developer host system 108 to import the VLUN associated with the new snapshot. Step 320 is similar to step 220 described above.

Step 320 is followed by step 322, which ends method 200.

Various other adaptations and combinations of features of the embodiments disclosed are within the scope of the invention. Numerous embodiments are encompassed by the following claims.

What is claimed is:

1. A method for a data storage system to allow a user on a host system coupled to the data storage system to update a snapshot in the data storage system, the user being without general editing privileges in the data storage system, the method comprising:
- creating a read-write snapshot in the data storage system, the read-write snapshot being a copy of production data, the production data being in the data storage system;
- exporting a logical unit number (LUN) assigned to the read-write snapshot to the host system;
- providing the user with read and write access to the read-write snapshot but not write access to the production data;
- receiving a request to update the read-write snapshot from the user;
- determining from an access control list if the user is permitted to update the read-write snapshot;
- when the user is permitted to update the read-write snapshot, updating the read-write snapshot by:
  - removing the LUN from the data storage system, comprising recording parameters of the LUN and deleting the LUN from the data storage system;
  - creating a new read-write snapshot that is another copy of the production data;
  - restoring the LUN for the new read-write snapshot, comprising
    - recreating the LUN from the recorded parameters and exporting the LUN to the host system, the recreated LUN and the deleted LUN having the same logical unit number; and
  - providing the user with read and write access to the new read-write snapshot but not write access to the production data.

2. The method of claim 1, wherein:
when the user is permitted to update the snapshot:
- prior to said removing the LUN, preparing the host system for removal of the LUN; and
- after said recreating the LUN, preparing the host system for restoration of the LUN.

3. The method of claim 2, wherein:
said preparing the host system for the removal of the LUN comprises instructing the host system to un-mount a file system of the data storage system from the host system; and
said preparing the host system for the restoration of the LUN comprises instructing the host system to mount the file system of the data storage system into the host system.

4. The method of claim 2, further comprising:
said preparing the host system for the removal of the LUN comprises instructing the host system to halt a database in the host system from accessing the LUN; and said preparing the host system for the restoration of the LUN comprises instructing the host system to resume the database.

5. The method of claim 1, wherein the access control list comprises a user name and a snapshot name for the read-write snapshot that the user is permitted to update.

6. The method of claim 1, wherein said creating a new read-write snapshot comprises creating the new read-write snapshot with a same name as the read-write snapshot.

7. The method of claim 1, wherein said creating a new read-write snapshot comprises creating the new read-write snapshot with a different name than the read-write snapshot.

8. The method of claim 1, further comprising:
- receiving a request to edit the access control list from another user;
- determining if the another user has administrative privileges in the data storage system; and
- when the another user has administrative privileges in the data storage system, modifying the access control list according to the another user.

9. The method of claim 1, wherein the user tests an application on the read-write and the new read-write snapshots.

10. The method of claim 1, wherein the read-write snapshot is a virtual volume.

11. A method for a data storage system to allow a user on a host system coupled to the data storage system to update a snapshot in the data storage system, the user being without general editing privileges in the data storage system, the method comprising:
- creating a read-only snapshot in the data storage system, the read-only snapshot being a copy of production data, the production data being in the data storage system;
- creating a read-write snapshot in the data storage system from the read-only snapshot;
- exporting a logical unit number (LUN) assigned to the read-write snapshot to the host system;
- providing the user with read and write access to the read-write snapshot but not write access to the production data;
- receiving a request to update the read-only snapshot and the read-write snapshot from the user;
- determining from an access control list if the user is permitted to update the read-only snapshot;
- when the user is permitted to update the read-only snapshot, updating the read-only snapshot with a new read-only snapshot of the production data;
- determining from an access control list if the user is permitted to update the read-write snapshot;
- when the user is permitted to update the read-write snapshot, updating the read-write snapshot by:
  - removing the LUN from the data storage system;
  - creating a new read-write snapshot from the new read-only snapshot;
  - restoring the LUN for the new read-write snapshot; and
  - providing the user with read and write access to the new read-write snapshot but not write access to the production data.

12. The method of claim 11, wherein:
said removing the LUN comprises disabling the LUN on the data storage system; and
said restoring the LUN comprises enabling the LUN on the data storage system.

* * * * *